(12) United States Patent
Thompson, Sr. et al.

(10) Patent No.: US 6,857,480 B2
(45) Date of Patent: Feb. 22, 2005

(54) ADJUSTABLE HEAD EDGER

(76) Inventors: Barry E. Thompson, Sr., 2869 Seminole Village Dr., Middleburg, FL (US) 32068; Joe M. Frost, Sr., 194 Royal Oak Dr., Guyton, GA (US) 31312

( * ) Notice: Subject to any disclaimer, the term of this patent is extended or adjusted under 35 U.S.C. 154(b) by 0 days.

(21) Appl. No.: 10/388,999

(22) Filed: Mar. 12, 2003

(65) Prior Publication Data

US 2004/0188108 A1 Sep. 30, 2004

Related U.S. Application Data (60) Provisional application No. 60/363,409, filed on Mar. 12, 2002.

(51) Int. Cl.[7] .............................................. A01B 45/04
(52) U.S. Cl. ......................................... 172/13; 30/276
(58) Field of Search .............................. 172/13, 14, 18, 172/25, 41, 123; 30/276, 310, 287, 300, 316, 500, DIG. 7

(56) References Cited

U.S. PATENT DOCUMENTS

| | | | | |
|---|---|---|---|---|
| 2,615,246 A | * | 10/1952 | Littig ........................... | 172/18 |
| 3,143,176 A | * | 8/1964 | Drane, Jr. ..................... | 172/13 |
| 3,554,293 A | * | 1/1971 | Aman et al. .................. | 172/13 |
| 3,905,103 A | * | 9/1975 | Ford et al. .................... | 30/276 |
| 3,960,218 A | | 6/1976 | Atchley et al. | |
| 4,209,903 A | | 7/1980 | Owens | |
| 4,260,026 A | * | 4/1981 | Deckert ....................... | 172/25 |
| 4,270,271 A | | 6/1981 | Feldman et al. | |
| 4,357,752 A | | 11/1982 | Goodwin, Jr. | |
| 4,479,302 A | | 10/1984 | Richter | |
| 4,547,966 A | | 10/1985 | Eden | |
| 4,832,131 A | * | 5/1989 | Powell et al. ................. | 172/25 |
| 5,242,024 A | | 9/1993 | Van Houten | |
| 5,461,788 A | | 10/1995 | Taylor | |
| 5,493,783 A | | 2/1996 | Oostendorp | |
| 5,938,290 A | | 8/1999 | Mikeska | |
| 6,032,442 A | | 3/2000 | Paolo | |
| 6,038,774 A | | 3/2000 | Boekeloo et al. | |
| 6,134,789 A | | 10/2000 | Strickland | |
| 6,293,350 B1 | | 9/2001 | Paolo | |
| 6,311,782 B1 | | 11/2001 | Plasek et al. | |
| 6,412,568 B1 | | 7/2002 | Thede | |

* cited by examiner

*Primary Examiner*—Robert E Pezzuto
(74) *Attorney, Agent, or Firm*—Mark J. Young (57) ABSTRACT

A head edger apparatus for producing a centered, uniform, repeatable cut around sprinkler heads (or similar objects), without marring or damaging the sprinkler heads includes a body, a plurality of cutting members releasably and adjustably attached to the body, a non-slip boot rotatably mounted to the center of the body. The body may be securely engaged to a rotatable shaft of a motorized trimmer. Rotation of a trimmer shaft causes the body to rotate. Cutting portions of the cutting members travel in a circular orbit having a determined radius, cutting a circular path as they travel around the sprinkler head. The boot is positioned on the top center of the sprinkler head, protecting the sprinkler head and providing a stable support around which the cutting members travel.

9 Claims, 7 Drawing Sheets

ADJUSTABLE HEAD EDGER

PRIORITY CLAIM

This application claims priority to U.S. Provisional Application No. 60/363,409, filed Mar. 12, 2002, the entire contents of which are hereby incorporated by reference herein.

FIELD OF THE INVENTION

This invention relates to landscaping. More particularly, this invention relates to an adjustable head edger for trimming grass around sprinkler heads without damaging the sprinkler heads.

BACKGROUND

Trimming and edging around lawn sprinkler heads is typically a time-consuming and tedious task. Grass surrounding a sprinkler head is often thick. Eventually, it may grow over the sprinkler head and impede operation. Frequent edging is required to provide a landscaped appearance and to permit sprinklers to operate properly.

Landscapers conventionally perform such edging either manually using scissors or shears or mechanically using conventional motorized grass trimming devices. Manual edging is extremely tedious, inefficient and impractical when a large number of sprinkler heads are involved, such as on a golf course. A golf course may have 800 to 1000 sprinkler heads. Concomitantly, golf courses place a premium on aesthetics and carefully manicured greens. Manual cutting is not conducive to a uniform, precise, repeatable and aesthetically pleasing cut.

While more efficient than scissors, conventional motorized trimmers that use a spinning cord are not conducive to a uniform, precise and aesthetically pleasing cut. Often they result in a scorched (i.e., extremely low cut) turf and a noticeably uneven cut due to bouncing of the cutting device off the surface of the ground. Additionally, such trimmers must be manipulated around the entire periphery of the sprinkler head, still making the job quite tedious. Furthermore, the cutting cords of such trimmers frequently break, especially after repeated contact with sprinkler heads, incurring additional time and cost for replacement. Moreover, such devices have a tendency to damage yardage markers commonly placed on sprinkler heads in golf courses and mar the contacted surfaces of the sprinkler heads.

While motorized rotary cutters have been developed for edging around sprinkler heads, these devices typically have a flimsy, unbalanced non-adjustable construction that does not adequately protect the sprinkler head. Though quicker and more efficient than scissors and conventional motorized trimmers, such devices still suffer many shortcomings. They tend to break easily, bounce upon contacting the sprinkler head, produce an off-centered non-uniform cut, damage yardage markers on sprinkler heads and mar the contacted surfaces of the sprinkler heads. Additionally, such devices typically do not provide adjustability to readily accommodate various sized sprinkler heads.

Thus, a device is needed to produce a centered, uniform, repeatable cut for edging around sprinkler heads, without marring or damaging the sprinkler heads or yardage markers on them. Such a device should also be adjustable to accommodate various sized sprinkler heads. Moreover, for economy, the device should be adaptable as an attachment to existing landscaping equipment.

SUMMARY

The present invention is a device for producing a centered, uniform, repeatable cut for edging around sprinkler heads, without marring or damaging the sprinkler heads or yardage markers on them. In a preferred embodiment the device is adjustable to accommodate various sized sprinkler heads and adaptable as an attachment to existing landscaping equipment.

In general, the device is comprised of a body, a plurality of cutting members attached to the body with cutting portions extending outward from the body, a boot rotatably mounted to the center of the body, and means for securely engaging a rotatable shaft of a trimmer to the body.

Rotation of the trimmer shaft causes the body to rotate. Cutting portions of the cutting members travel in a circular orbit having a diameter that is greater than the sprinkler head. The boot can be positioned on the top center of the sprinkler head, thereby protecting the sprinkler head and providing a stable support around which the cutting members travel. The cutting portions of the cutting members cut a circular path as they travel around the sprinkler head.

In a preferred embodiment, the body is comprised of a rigid, durable material, has a disc-shape and is well-balanced about its center of rotation. The body also preferably includes cutouts to enable a user to view a sprinkler head and grass while cutting.

The cutting members may include adjustment means for adjusting the radial position of the cutting members to accommodate sprinkler heads of various diameters. Preferably the cutting members are releasably attached to the body to enable replacement and/or sharpening.

The boot is preferably comprised of a non-slip material that will not damage the surface of a sprinkler head. The material may include a rubber, relatively soft plastic or a polymer. The boot is rotatably mounted to the body. A shaft preferably extends from the boot to a bearing. The bearing is preferably removably mounted in the body. In operation, the boot may remain stationary on a sprinkler head while the body rotates.

It is therefore an object of the present invention to provide a device for producing a centered, uniform, repeatable cut for edging around sprinkler heads.

It is another object of the invention to provide a device for producing a centered, uniform, repeatable cut for edging around sprinkler heads, without marring or damaging the sprinkler heads or yardage markers on sprinkler heads.

It is also another object of the invention to provide a device for producing a centered, uniform, repeatable cut for edging around sprinkler heads wherein the device is adjustable to accommodate various sized sprinkler heads.

It is yet another object of the invention to provide a device for producing a centered, uniform, repeatable cut for edging around sprinkler heads wherein the device is adaptable as an attachment to existing landscaping equipment.

BRIEF DESCRIPTION OF THE DRAWINGS

The foregoing and other objects, features and advantages of the present invention will become better understood with reference to the following description, appended claims, and accompanying drawings, where:

DETAILED DESCRIPTION

The present invention is a device for producing a centered, uniform, repeatable cut for edging around sprinkler heads, without marring or damaging the sprinkler heads or yardage markers on them. In a preferred embodiment the device is adjustable to accommodate various sized sprinkler heads and adaptable as an attachment to existing landscaping equipment.

Figure 1:
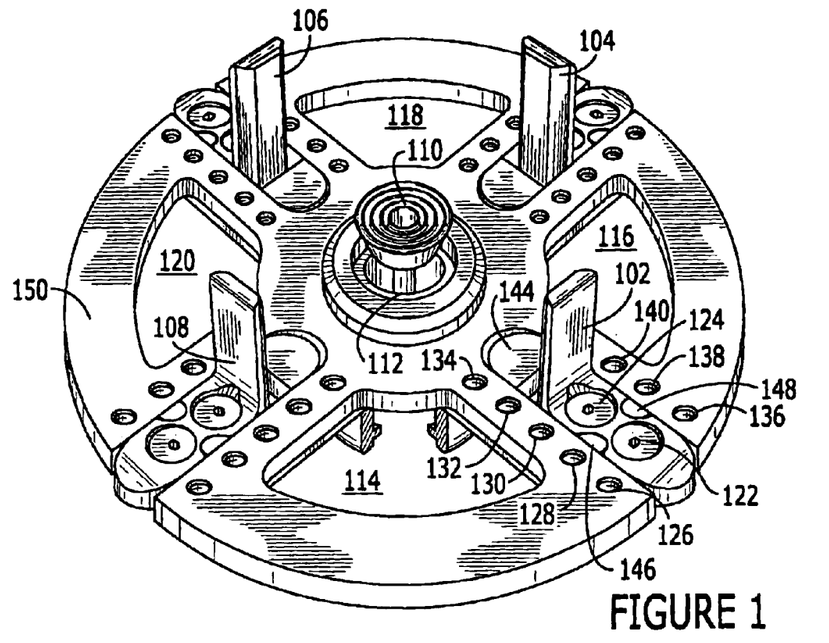
FIG. 1 is a surface perspective view conceptually illustrating the bottom of an assembled head edger apparatus in accordance with an exemplary embodiment of the present invention.

Referring to FIG. 1, a surface perspective view conceptually illustrating the bottom of an assembled head edger apparatus in accordance with an exemplary embodiment of the present invention is shown. The device is generally comprised of a head edger body (i.e., body), a plurality of cutting members removably and adjustably attached to the body with cutting portions extending outward from the body, a boot rotatably mounted to the center of the body, means for securely engaging a rotatable shaft of a trimmer to the body. The bottom (i.e., cutting side) of the device is featured in FIG. 1.

The body 150 supports cutting members 102–108, a boot 110, means for rotatably mounting the boot to the body and various attachment means. The body 150 is preferably a generally disc shaped member having a plurality of threaded holes (e.g., 126–144) for receiving threaded attachment means (e.g., screws) for purposes of attaching sliders (discussed below) to which cutting members are preferably attached. Similar threaded holes are preferably provided in each slider for attaching a cutting member 102–108. Of course, the invention does not depend upon the depicted arrangement, number or types of attachment means. Other arrangements, numbers and types of means for attaching sliders and/or cutting members to the body may be used without departing from the scope of the present invention.

The body 150 preferably has cutouts 114–120 to facilitate visualization of the ground and objects beneath the head edger while in use. The cutouts enable a user to see grass being cut, and, depending upon the dimensions of the cutout and a sprinkler head around which the head edger is trimming, possibly a portion of the sprinkler head. The cutouts also help reduce weight of the body without compromising its structural integrity. Those skilled in the art will appreciate that various numbers of cutouts and cutouts of various shapes and sizes can be used without departing from the scope of the present invention. However, it is preferred that the cutouts result in a balanced body. Any appreciable imbalance can result in vibrations when the body rotates about the center, which can result in an uneven non-uniform cut, excessive wear on bearings and edge trimmer components, and increased user fatigue.

In a preferred embodiment, a boot 110 is rotatably mounted to a bearing 112 at the center of rotation of the body 150. A shaft (not shown) extends from the bearing 112 to the boot 110. The boot 110 is preferably comprised of a non-slip durable material that will not damage the surface of a sprinkler head. By way of example, and not limitation, the material may include a rubber, relatively soft plastic or a polymer. The bearing 112 is preferably removably mounted in the body to facilitate periodic replacement and access to the inside of the shank of the body, as discussed below. In operation, the boot may remain stationary on the top surface of the sprinkler head, preferably at the center of the sprinkler head surface, while the body 150 rotates. The boot thus provides a protective surface for placement on a sprinkler head. It also provides a stable support for producing a level, uniform, repeatable cut. The shaft extending from the bearing 112 to the boot 110 defines the center of rotation. Those skilled in the art will appreciate that various boot designs and rotatable mountings can be used without departing from the scope of the present invention. However, it is important that the rotatable mounting provide a balanced center of rotation of the body at the center of gravity. Any appreciable eccentricity can result in undesirable vibrations.

Figure 2:
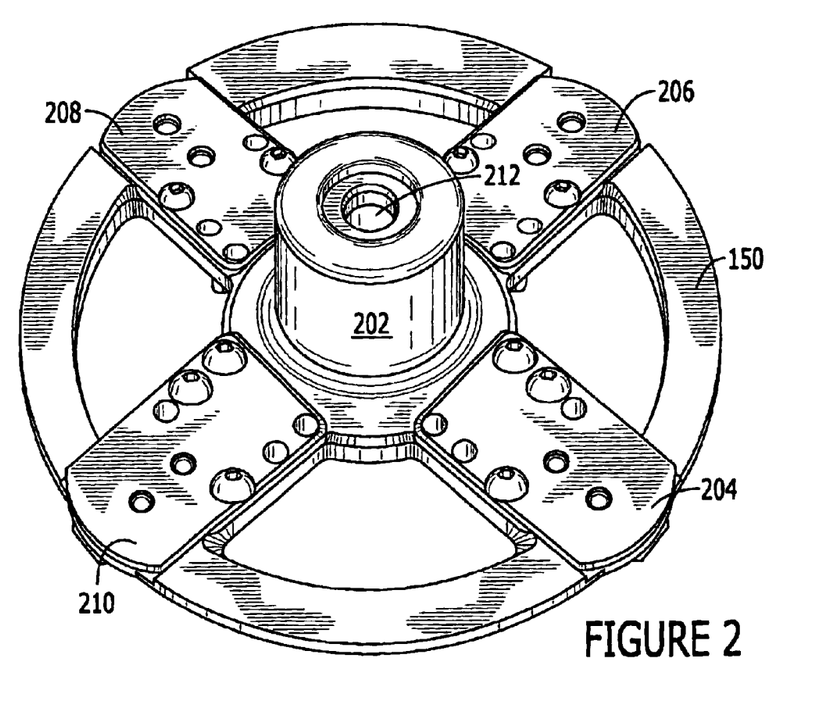
FIG. 2 is a surface perspective view conceptually illustrating the top of an assembled head edger apparatus in accordance with an exemplary embodiment of the present invention.

Referring now to FIG. 2, a surface perspective view conceptually illustrating the top of an assembled head edger apparatus in accordance with an exemplary embodiment of the present invention is shown. The body 150, preferably includes a hollow shank 202 as a means for engaging a rotatable shaft of a motorized garden trimmer. Typically, shafts of commercial trimmers have a threaded end 615. The threaded end 615 typically has a smaller diameter than the rest of the shaft 620, as conceptually illustrated in FIG. 6. To securely engage the shaft, a nut, such as a lock nut 605, may be utilized as conceptually illustrated in FIG. 6. The threaded end of the shaft 615 passes through the shank opening 212 and smaller engagement opening 625. The locking nut 605 engages the threaded end 615 and is tightened against the inner shelf 610. The larger diameter portion of the shaft 620 does not pass through engagement opening 625. In an exemplary embodiment, the shank opening 212 is approximately one inch (1") in diameter and the smaller engagement opening 625 is approximately five-eighths of an inch (⅝") in diameter. Of course the locking nut 605 is sized to accommodate the threaded end 615 of the shaft and not to pass through engagement opening 675.

Figure 6:
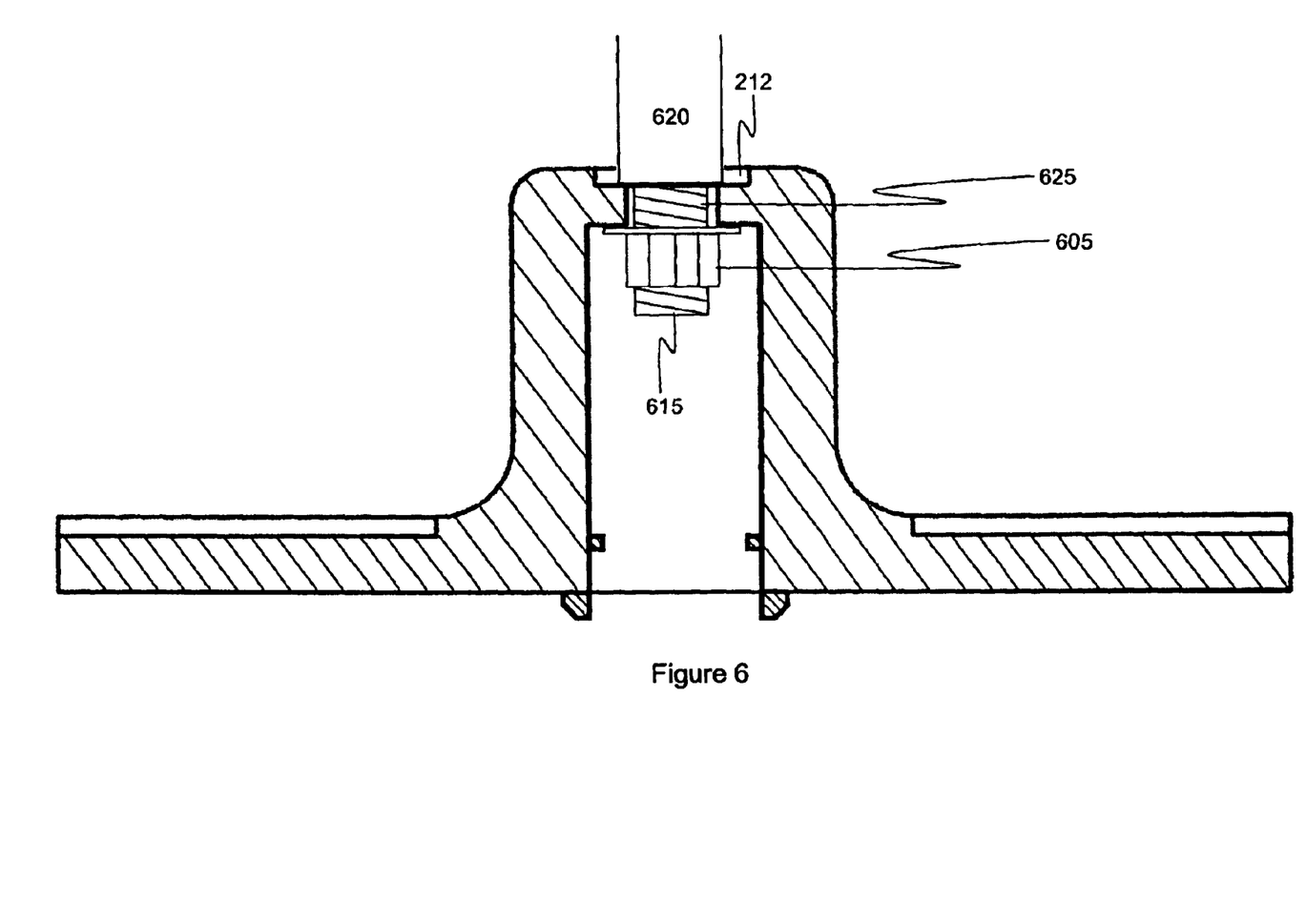
FIG. 6 is a cutaway view conceptually illustrating a hollow shank and locking nut of a head edger apparatus in accordance with an exemplary embodiment of the present invention.

Those skilled in the art will appreciate that the means for securely engaging a rotatable shaft of a motorized trimmer described above is but one example of a suitable engagement means. Other means for securely engaging a rotatable shaft (with or without a threaded end) of a motorized trimmer may be used without departing from the scope of the present invention. By way of example and not limitation, engagement opening 625 may be sized and threaded to engage the threaded end 615 of the shaft. A disadvantage of that approach is that the threaded engagement opening 625 will accommodate only the threaded shaft for which it was designed. Additionally, if the threads of engagement opening 625 become damaged, either the threads must be repaired (e.g., by inserting a replacement bushing or a helicoil) or the entire body 150 must be replaced. In contrast, with the exemplary engagement means described above, the locking nut 605 can be sized to accommodate various sized threaded ends and various types of threads. The locking nut 605 can also be easily replaced in the event it is damaged, without having to replace the entire body. Despite the disadvantages of a threaded engagement opening as compared to the preferred engagement means described above, the threaded engagement opening is an example of an alternative engagement means that comes within the scope of the present invention.

As discussed above, the bearing 112 is preferably removably mounted to the body to facilitate periodic replacement and access to the inside of the shank of the body. The bearing 112 may be pressed in, or held in place with an engagement screw or other bearing retention means. Upon removal of the bearing 112, a user may access the inside of the shank of the body to remove the locking nut 605 from the threaded end of the shaft 615, or to tighten the locking nut 605 onto the threaded end of the shaft 615.

The body 150 is comprised of a strong, durable material that is preferably either corrosion resistant or treated (e.g., painted or coated) to resist corrosion. Ideally, the material is relatively inexpensive, abundant and easy to use in conventional manufacturing operations. While in an exemplary embodiment, the body 150 is comprised of aluminum and is formed using conventional CNC (computer numerically controlled) machining equipment and techniques, the present invention is not limited to use of aluminum or to such machining to form the body. Rather, other metals, alloys, plastics, composites and other materials that provide adequate structural integrity may be used without departing from the scope of the present invention. Likewise, other manufacturing techniques may be used to form the body without departing from the scope of the present invention.

Figure 5:
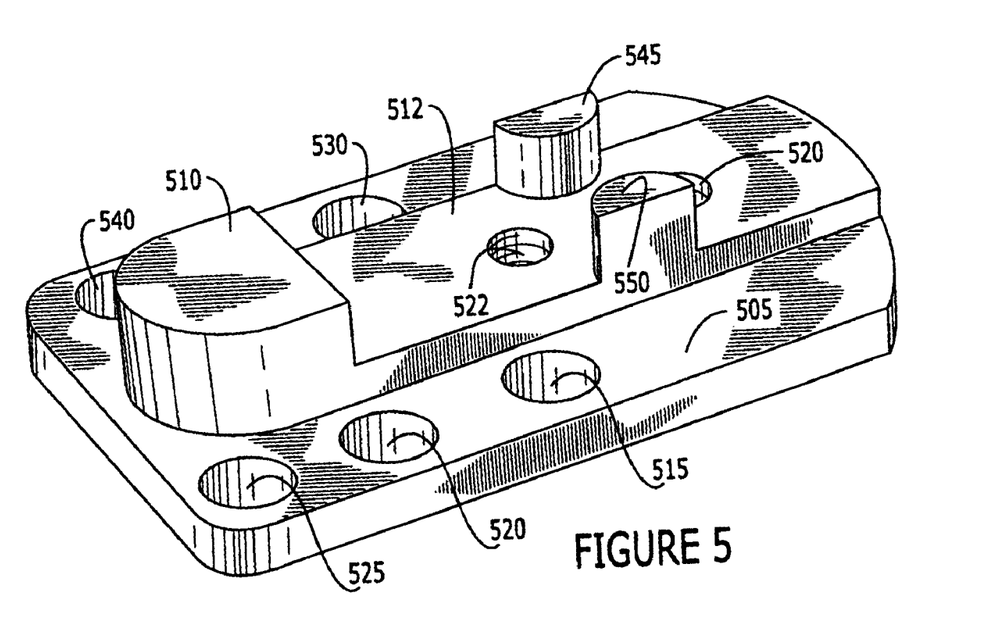
FIG. 5 is a surface perspective view conceptually illustrating a slider for a head edger apparatus in accordance with an exemplary embodiment of the present invention.

In a preferred embodiment, cutting members 102–108 are releasably attached to sliders 204–210, which are releasably attached to the body 150 of the head edger. The sliders 204–210 provide releasable and adjustable means for attaching the cutting members 102–108 to the body 150. Referring to FIG. 5, each slider preferably includes a base 505, a slider head 510 and a slider guide 512 for engagement by a U-shaped channel (discussed below) of the body 150 of the head edger, a plurality of slider mounting holes 515–540 for receiving bolts to attach the sliders 204–210 to the body 150, a plurality of cutting member mounting holes (preferably threaded) 520 and 522 in the slider guide 512, and a pair of cutting member engagement prongs 545 and 550 for engaging a cutting member. The threaded shafts of bolts pass through the holes 515–540 in the slider and thread into the threaded holes (e.g., 126–144) provided in the body 150. Preferably, the bolts are sized in length to enable tightening the slider to the body without having substantial portions of the tightened bolts protrude from the bottom surface of the body.

Figure 3:
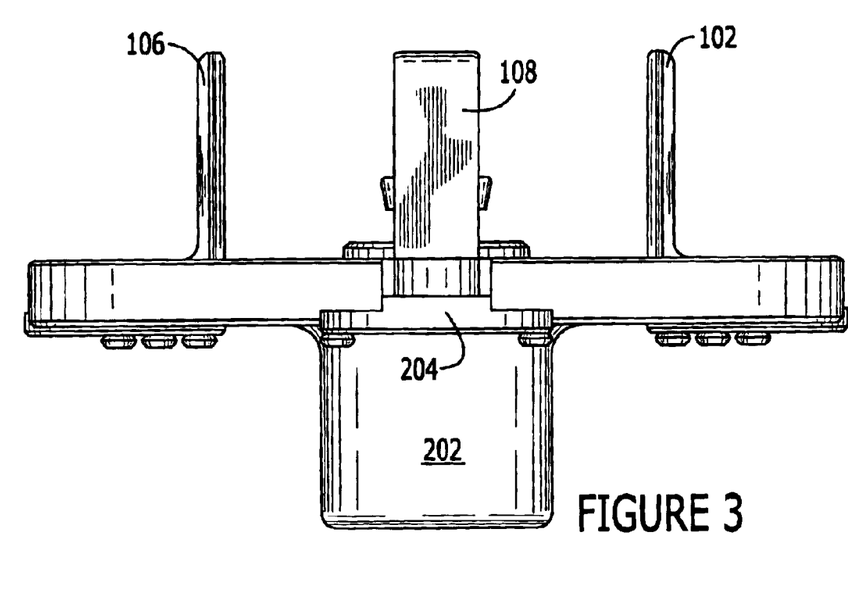
FIG. 3 is a surface perspective view conceptually illustrating a side of an assembled head edger apparatus in accordance with an exemplary embodiment of the present invention.
Figure 7:
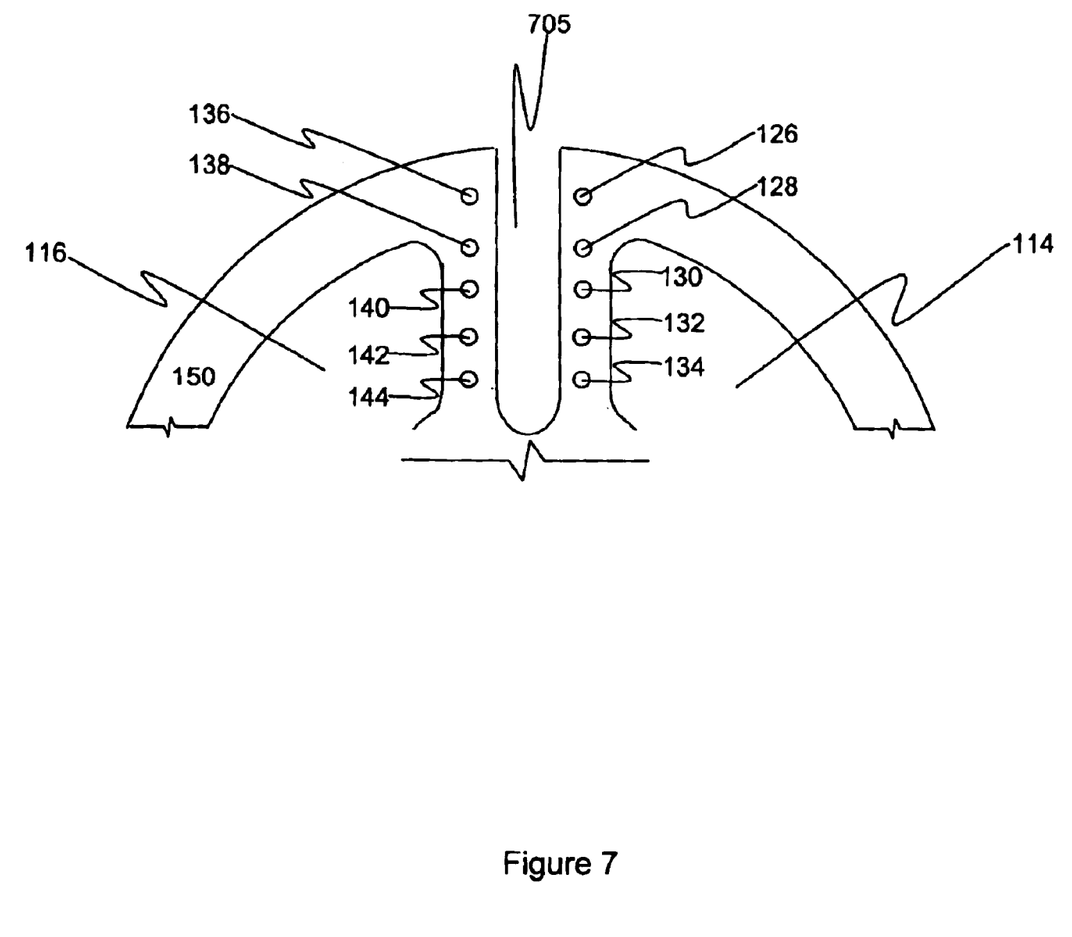
FIG. 7, is a bottom plan view of a cutaway portion of the body of a head edger apparatus in accordance with an exemplary embodiment of the present invention.
Figure 8:
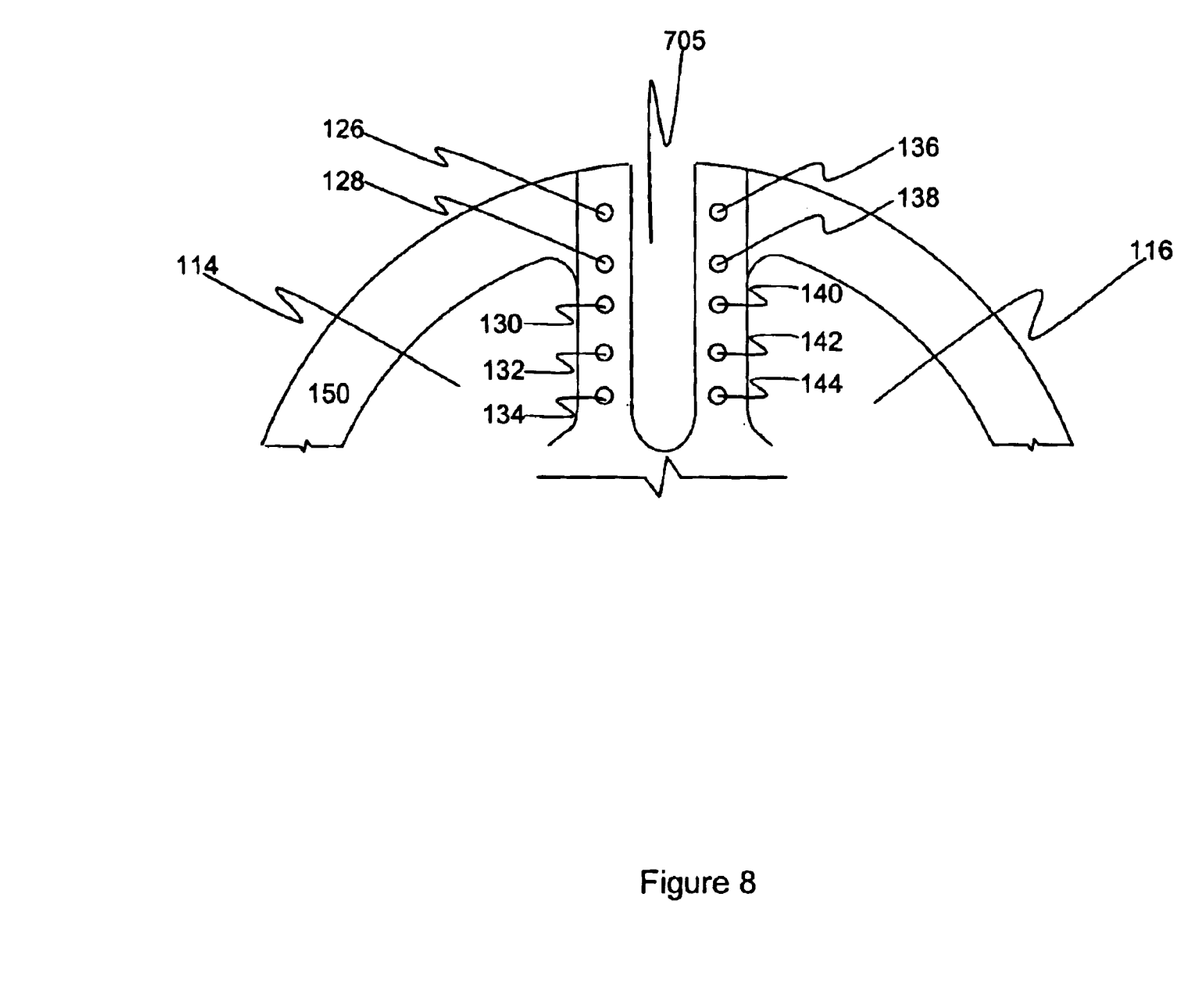
FIG. 8, is a top plan view of a cutaway portion of the body of a head edger apparatus in accordance with an exemplary embodiment of the present invention.

Preferably the attachment position of each slider is adjustable. Referring now to FIGS. 7 and 8, bottom and top plan views of a cut away portion of the body 150 of an exemplary head edger are provided to conceptually illustrate the region to which a slider is mounted. A U-shaped channel 705 provides a region for slidably engaging a slider head 510 and slider guide 512. A slider may be positioned such that its slider head 510 and slider guide 512 are within the U-shaped channel 705, and preferably at least two mounting holes (e.g., 515–540) of the slider align with threaded mounting holes (e.g., 126–144) of the head edger body 150. Thus threaded shafts of mounting bolts may pass through the at least two aligned holes (e.g., 515–540) of the slider and thread into the aligned threaded holes (e.g., 126–144) of the body 150. Recessed regions on the top of the of the head edger body 150 are preferably provided to receive the slider base. In FIG. 8, the recessed region is the region defined between parallel lines 805 and 810. A side view of the recessed region is provided in FIG. 3.

A slider in accordance with an exemplary embodiment of the present invention as described above may, thus, be mounted such that the slider head is at a determined radial distance from the center of rotation of the head edger body. The cutting members will be mounted to the slider. Therefore, to provide its largest cutting radius, the slider may be mounted such that the slider head is at a maximum available radial distance from the center of rotation of the head edger body. To provide its smallest cutting radius, the slider may be mounted such that the slider head is at a minimum available radial distance from the center of rotation of the head edger body. Of course, there may be several possible settings in between the largest and smallest cutting radius. By way of example and not limitation, the smallest cutting radius may be approximately one to two and a half inches (1" to 2½"). The largest cutting radius may be approximately three and a half to five inches (3½" to 5"). Those skilled in the art will appreciate that a head edger in accordance with the present invention may be designed with dimensions to provide a range of adjustable cutting radii.

Like the body 150 of the head edger, the sliders 204–210 are preferably comprised of a strong, durable material that is preferably either corrosion resistant or treated (e.g., painted or coated) to resist corrosion. Ideally, the material is relatively inexpensive, abundant and easy to use in conventional manufacturing operations. While in an exemplary embodiment, the sliders 204–210 are comprised of aluminum and are formed using conventional CNC (computer numerically controlled) machining equipment and techniques, the present invention is not limited to use of aluminum or to such machining to form the sliders. Rather, other metals, alloys, plastics, composites and other materials that provide adequate structural integrity may be used without departing from the scope of the present invention. Likewise, other manufacturing techniques may be used to form the sliders without departing from the scope of the present invention.

Figure 4:
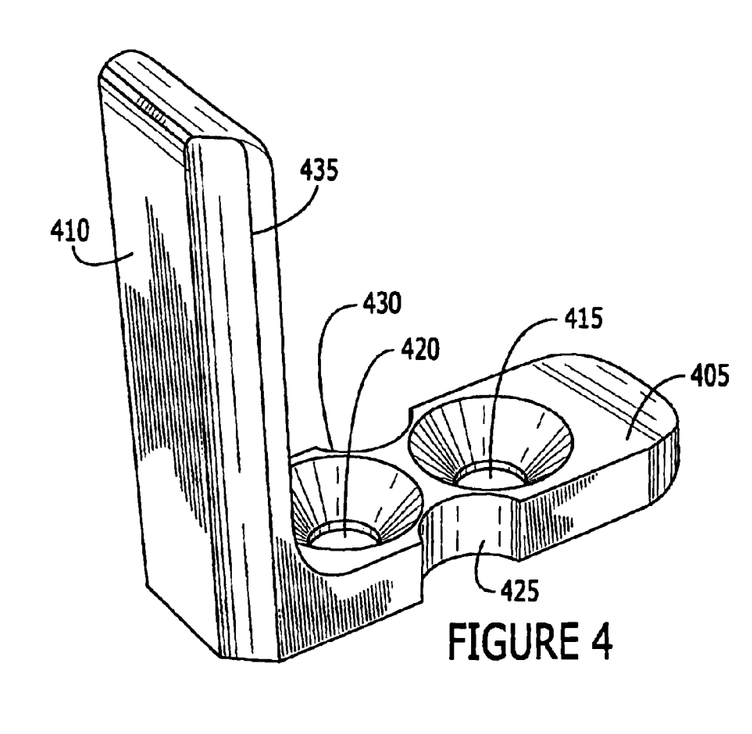
FIG. 4 is a surface perspective view conceptually illustrating a cutting member for a head edger apparatus in accordance with an exemplary embodiment of the present invention.

As discussed above, in a preferred embodiment, cutting members 102–108 are releasably attached to sliders 204–210, which are releasably attached to the body 150 of the head edger. Referring to FIG. 4, an exemplary cutting member for use in connection with a slider (i.e., a slider as conceptually depicted in FIG. 5) includes a cutting member base 405 with a plurality of mounting holes 415 and 420, a plurality of indentations 425 and 430 for engaging cutting member engagement prongs 545 and 550 of a slider, and a vertical blade 410 for cutting. The mounting holes 415 and 420 preferably receive the threaded shafts of bolts, which are then threaded into corresponding cutting member mounting holes 520 and 522 in the slider guide 512 to securely (but releasably) attach the cutting member to a slider. The vertical blade 410 preferably has at least one vertical edge (e.g., 435) formed or machined (e.g., sharpened) for cutting grass. The vertical edge (e.g., 435) formed or machined for cutting grass should be the leading edge of the vertical blade 410 as it travels in a circular orbit when the head edger is in use.

Of course, the vertical edge (not shown) opposite edge 435 may also be formed or machined (e.g., sharpened) for cutting grass. In such case, when edge 435 becomes dull from use, a user may be able to remount the cutting member so that the opposite edge becomes the leading edge of the vertical blade 410 as it travels in a circular orbit when the head edger is in use. Thus, having a sharp opposite edge may substantially enhance the useful life of the cutting member.

Those skilled in the art will appreciate that the L-shaped cutting member depicted in FIG. 4 is but one example of a cutting member for use in connection with a head edger in accordance with the present invention. Cutting members having other shapes (e.g., a T-shaped cutting member wherein the vertical blade protrudes from the center of the cutting member base, or an I-shaped cutting member with the bottom horizontal portion being a sharpened cutting blade) may be used without departing from the scope of the present invention. The blade portion need not be perpendicular to the mounting base of the cutting member to come within the scope of the present invention.

Figure 9:
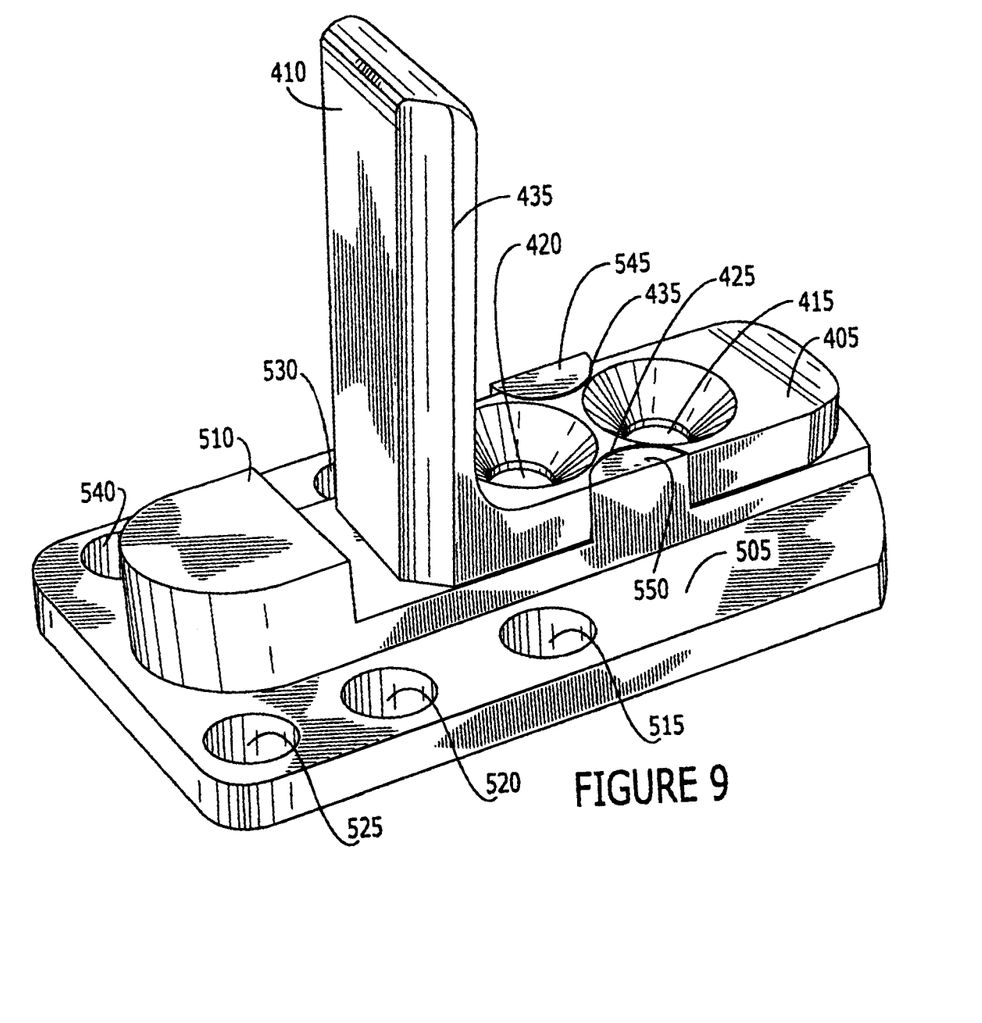
FIG. 9 is a surface perspective view conceptually illustrating a cutting member positioned on a slider in accordance with an exemplary embodiment of the present invention.

Referring now to FIG. 9, a cutting member positioned on a slider is shown. The engagement prongs 520 and 545 engage the cutting member at indentations 425 and 435. Mounting holes 415 and 420 preferably align with threaded mounting holes 520 and 522 in the slider guide.

Like the body 150 of the head edger and the sliders 204–210, the cutting members 102–108 are preferably comprised of a strong, durable material that is preferably either corrosion resistant or treated (e.g., painted or coated) to resist corrosion. Ideally, the material is relatively inexpensive, abundant and easy to use in conventional manufacturing operations. While in an exemplary embodiment, the cutting members 102–108 are comprised of aluminum and are formed using conventional CNC (computer numerically controlled) machining equipment and techniques, the present invention is not limited to use of aluminum or to such machining to form the sliders. Rather, other metals (e.g., steels, stainless steels and hardened steels), alloys, ceramics, composites and other materials that provide adequate structural integrity and cutting capability may be used without departing from the scope of the present invention. Likewise, other manufacturing techniques may be used to form the cutting members without departing from the scope of the present invention.

The cutting members 102–108, sliders 204–210 and threaded holes (e.g., 126–144) in the body of the head edger, as described above, are examples of means for releasably attaching cutting members to the body of the head edger. Other means for releasably attaching cutting members to the body of the head edger (e.g., bolting or riveting cutting members directly to the body of the head edger) may be used without departing from the scope of the present invention. Additionally, numbers of cutting members greater than or less than four (4), and spacings and arrangements other than as depicted in the Figures and discussed above, may be used without departing from the scope of the present invention; though, preferably, the number, spacings and arrangements result in a head edger that is substantially balanced about its center of rotation.

Advantageously, a head edger in accordance with a preferred implementation of the present invention provides enhanced safety in several ways. First, it provides a rotationally balanced device that can be stably positioned using the protective non-slip boot. Second, under normal operation, the vertical blades of the cutting members can be positioned at a radial distance from the center of rotation of the body that is less than the radius of the body. That means the cutting blades are not exposed at or beyond the radius; thereby reducing the risk of accidental injury.

The foregoing detailed description of particular preferred implementations of the invention, which should be read in conjunction with the accompanying drawings, is not intended to limit the enumerated claims, but to serve as particular examples of the invention. Those skilled in the art should appreciate that they can readily use the concepts and specific implementations disclosed as bases for modifying or designing other methods and systems for carrying out the same purposes of the present invention. Those skilled in the art should also realize that such equivalent methods and systems do not depart from the spirit and scope of the invention as claimed.

What is claimed is:

1. A head edger for use with a motorized trimmer having a rotatable shaft, said head edger being comprised of a body, a plurality of radially adjustable cutting members, means for releasably attaching the plurality of cutting members to the body, a boot, said boot being adapted for positioning during use atop a head, and means for rotatably mounting the boot to the body.

2. A head edger according to claim 1, said head edger further including means for releasably engaging the body to the rotatable shall of the motorized trimmer.

3. A head edger according to claim 2, wherein the means for rotatably mounting the boot to the body includes a bearing, means for rotatably mounting the boot to the bearing and means for releasably attaching the bearing to the body.

4. A head edger according to claim 3, wherein the boot is a non-slip boot.

5. A head edger according to claim 4, wherein the body includes at least one cutout to facilitate viewing a work area.

6. A head edger according to claim 5, wherein each of the plurality of cutting members includes a mounting base and a cutting blade.

7. A head edger according to claim 5, wherein means for releasably attaching the plurality of cutting members to the body includes a slider for each of the plurality of cutting members.

8. A head edger for use with a motorized trimmer having a rotatable shaft, said head edger being comprised of:

a body, said body including at least one cutout to facilitate viewing a work area a plurality of cutting members, said plurality of cutting members including a mounting base and a cutting blade, means for releasably attaching the plurality of cutting members to the body, said means for releasably attaching the plurality of cutting members to the body including a slider for each of the plurality of cutting members, means for releasably engaging the body to the rotatable shaft of the motorized trimmer, a boot, said boot being a non-slip boot adapted for placement atop a head while said head edger is in use, means for rotatably mounting the boot to the body, wherein the means for rotatably mounting the boot to the body includes a bearing, means for rotatably mounting the boot to the bearing and means releasably attaching the bearing to the body.

9. A method for trimming grass around an object using a head edger in accordance with claim 8 and a motorized trimmer having a rotatable shaft, said object having a diameter less than the cutting diameter of the head edger, said method comprising steps of:

radially adjusting the position of the cutting members to provide a determined cutting radius, engaging the body of the head edger to the rotatable shaft of the motorized trimmer, placing the boot of the head edger on the top surface of an object at or near the center of the top surface of the object; and running the motorized trimmer to cause the rotatable shaft and the engaged body of the head edger to rotate.

* * * * *